(12) United States Patent
Husson et al.

(10) Patent No.: US 10,976,707 B2
(45) Date of Patent: Apr. 13, 2021

(54) DECORATIVE OBJECT, IN PARTICULAR WATCH GLASS, WITH AN OPTICAL EFFECT

(71) Applicant: CARTIER INTERNATIONAL AG, Steinhausen (CH)

(72) Inventors: Rémi Husson, Neuchâtel (CH); Gabriel Chevallier, Allinges (FR); Romain Moyse, Montlebon (FR)

(73) Assignee: CARTIER INTERNATIONAL AG, Steinhausen (CH)

( * ) Notice: Subject to any disclaimer, the term of this patent is extended or adjusted under 35 U.S.C. 154(b) by 248 days.

(21) Appl. No.: 16/076,450

(22) PCT Filed: Feb. 9, 2017

(86) PCT No.: PCT/IB2017/050703
§ 371 (c)(1),
(2) Date: Aug. 8, 2018

(87) PCT Pub. No.: WO2017/137915
PCT Pub. Date: Aug. 17, 2017

(65) Prior Publication Data
US 2019/0041800 A1 Feb. 7, 2019

(30) Foreign Application Priority Data
Feb. 12, 2016 (CH) .................. 00185/16

(51) Int. Cl.
*G04B 37/02* (2006.01)
*B44C 1/22* (2006.01)
(Continued)

(52) U.S. Cl.
CPC .............. *G04B 37/02* (2013.01); *B44C 1/227* (2013.01); *B44F 1/066* (2013.01); *B44F 1/10* (2013.01);
(Continued)

(58) Field of Classification Search
CPC .... G04B 37/02; G04B 39/002; G04B 39/006; G04B 45/0076
See application file for complete search history.

(56) References Cited

U.S. PATENT DOCUMENTS 1,850,190 A    3/1932  Welch
2008/0159083 A1* 7/2008  Kawakami ............. G04B 19/12
                                             368/232

FOREIGN PATENT DOCUMENTS

DE   87 01 203      7/1987
EP   0 372 882 A2   6/1990
(Continued)

OTHER PUBLICATIONS

International Search Report, PCT/IB2017/050703, dated Apr. 11, 2017.
Written Opinion, PCT/IB2017/050703, dated Apr. 11, 2017.

*Primary Examiner* — Edwin A. Leon
*Assistant Examiner* — Jason M Collins
(74) *Attorney, Agent, or Firm* — Nixon & Vanderhye

(57) ABSTRACT

Disclosed is a decorative object including an upper glass, a lower glass, a recessed pattern formed in the lower glass and facing the upper glass, a liquid filling the recessed pattern, the refractive index of the liquid being equal to that of the lower glass or differing from that of the lower glass by at most 10%, and solid elements which can move in the liquid.

20 Claims, 3 Drawing Sheets

(51) Int. Cl.
*B44F 1/06* (2006.01)
*C03C 15/00* (2006.01)
*C03C 23/00* (2006.01)
*G04B 39/00* (2006.01)
*G04B 45/00* (2006.01)
*B44F 1/10* (2006.01)

(52) U.S. Cl.
CPC .......... *C03C 15/00* (2013.01); *C03C 23/0025* (2013.01); *G04B 39/002* (2013.01); *G04B 39/006* (2013.01); *G04B 45/0076* (2013.01)

(56) References Cited

FOREIGN PATENT DOCUMENTS

| | | |
|---|---|---|
| EP | 0 373 804 | 6/1990 |
| GB | 2 125 991 | 3/1984 |
| JP | 2008-122162 A | 5/2008 |
| JP | 2009-085758 | 4/2009 |
| WO | WO 2015/150910 | 10/2015 |
| WO | WO 2016/004540 | 1/2016 |

* cited by examiner

DECORATIVE OBJECT, IN PARTICULAR WATCH GLASS, WITH AN OPTICAL EFFECT

BACKGROUND OF THE INVENTION

Field of the Invention

The present invention relates to a decorative object which can be used as a watch glass, and more particularly a decorative object producing an optical effect.

Description of the Related Art

The prior art contains watches in which the glass, through which the dial can be seen, encloses a liquid containing suspended particles. Such a glass renders the watch more attractive, but the optical effect is quite limited.

BRIEF SUMMARY OF THE INVENTION

The present invention aims to create a particular optical effect and to this end proposes a decorative object, in particular a watch glass, comprising:
- an upper glass,
- a lower glass,
- a recessed pattern formed in the lower glass and facing the upper glass,
- a liquid filling the recessed pattern, the refractive index of the liquid being equal to that of the lower glass or differing from that of the lower glass by at most 10%, preferably at most 5%, more preferably at most 2%, and
- solid elements which can move in the liquid.

Such a decorative object allows a pattern to be displayed in a mysterious manner, by mobile solid elements, such as balls, without the walls of the recessed pattern in which these balls circulate being visible.

In embodiments of the invention, the upper glass and the lower glass define between them an internal cavity to which the recessed pattern is open.

Preferably, the liquid fills the recessed pattern and the internal cavity completely.

The internal cavity can have a height sufficient for the solid elements to be able to completely exit the recessed pattern.

Conversely, the internal cavity can have a height not sufficient to allow the solid elements to completely exit the recessed pattern.

Typically, the recessed pattern comprises mutually communicating channels in the lower glass.

In embodiments of the invention, the lower glass is formed of one of the following materials: borosilicate, crystalline glass, fused silica, crown glass, flint glass, quartz, transparent ceramic, sapphire, polymethyl methacrylate, polycarbonate, polyurethane. The upper glass can also be formed of one of these materials.

Advantageously, the upper glass is formed of a harder material than the material of the lower glass. This hardness provides the upper glass with better resistance to scratches, which is an advantage when the upper glass is in contact with the exterior of the watch.

In accordance with a preferred example, the upper glass is formed of sapphire and the lower glass is formed of borosilicate.

BRIEF DESCRIPTION OF THE DRAWINGS

Other features and advantages of the present invention will become clear upon reading the following detailed description given with reference to the attached drawings in which.

DETAILED DESCRIPTION OF THE PREFERRED EMBODIMENTS

Figure 1:
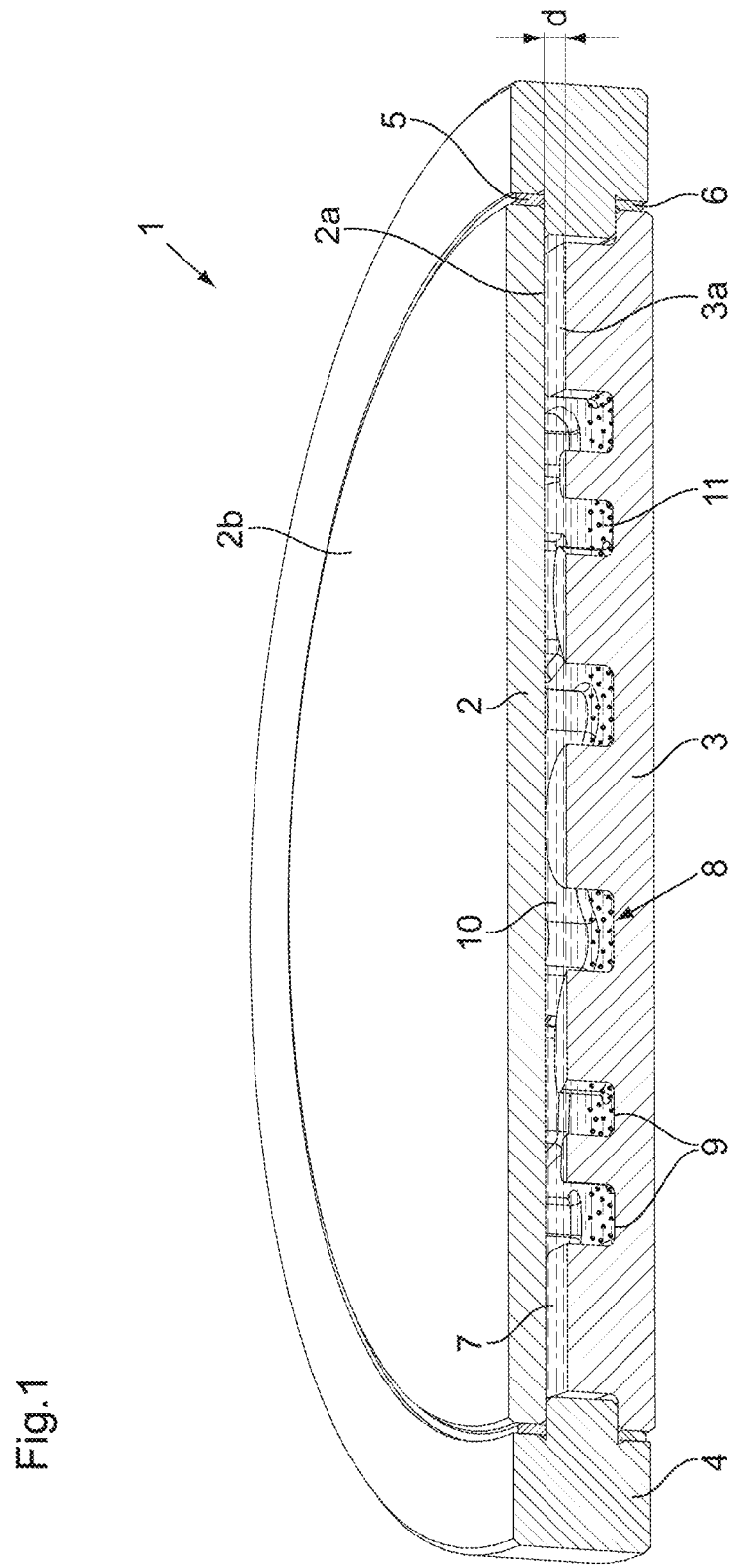
FIG. 1 is a perspective half-view of a watch glass in accordance with one preferred embodiment of the invention.

Within the scope of the present invention, the terms "lower" and "upper" are defined with reference to the position of the watch glass as shown in FIG. 1. The term "glass" is understood to mean any plate formed of a material which is at least partially transparent and preferably fully transparent and colourless.

With reference to FIG. 1, a watch glass 1 in accordance with a preferred embodiment of the invention comprises an upper glass 2 and a lower glass 3, which are held together by a frame or ring 4, typically of metal. The watch glass 1 can form the glass of a watch casing, through which the dial of the watch can be seen, or an auxiliary glass beneath a main glass of the watch casing. The watch glass 1 can also be used, as a variant, as a transparent back for the watch casing. Each of the upper and lower glasses 2, 3 is fixed, e.g. driven, soldered or welded, in the ring 4, optionally with a sealing joint 5, 6 between the glass 2, 3 and the ring 4. The ring 4 is intended to be fixed to a piece of the watch casing such as the case middle.

The upper glass 2 and the lower glass 3 are spaced apart by a distance d so as to form between them an internal cavity 7, of which the two main walls are the lower face 2a of the upper glass 2 and the upper face 3a of the lower glass 3. The upper face 3a of the lower glass 3 is etched to form a recessed pattern 8 open to the internal cavity 7. The recessed pattern 8 is preferably in the form of channels 9 which mutually communicate in the lower glass 3. The internal cavity 7 recessed pattern 8 assembly forms a closed space, preferably a sealed space. In the illustrated example, the main faces of the upper glass 2 and the lower glass 3 are flat but they could have another shape. For example, the lower face 2a and the upper face 2b of the upper glass 2 could be hollow and domed respectively.

The internal cavity 7 and the recessed pattern 8 are filled, preferably completely so as to avoid air bubbles, with a liquid 10 containing balls 11 or other mobile solid elements. The liquid 10 is at least partially transparent, and preferably is fully transparent and colourless. Its refractive index is equal to that of the lower glass 3 or sufficiently close to that of the lower glass 3 so that the pattern 8 is substantially invisible. More precisely, the refractive index of the liquid 10 is equal to that of the lower glass 3 or different from (lower than or greater than) that of the lower glass 3 by at most 10%, preferably at most 5%, more preferably at most 2%. The expression "refractive index" is understood to mean, within the scope of the present invention, a refractive index measured at a wavelength of 700 nm, at a temperature of 20 to 25° C. and at atmospheric pressure. Owing to the fact that this refractive index of the liquid 10 is substantially equal to that of the lower glass 3, the pattern 8 is substantially invisible without it being necessary to polish the upper face 3a of the lower glass 3 and the walls of the recessed pattern 8 (which may have a complex geometry). Indeed, the liquid 10 in contact with the lower glass 3 and said walls fills the surface roughness.

Preferably, the watch glass 1 also comprises a device (not shown) for compensating for the thermal expansion of the liquid 10 so as to compensate for variations in volume of the liquid associated with temperature. This device can have different forms, such as a flexible membrane as disclosed in patent application WO 2015/150910.

The upper glass 2 and the lower glass 3 can be made of the same material or different materials. Examples of materials which may be suitable for the glasses 2, 3 are the following: borosilicate, crystalline glass, fused silica, crown glass, flint glass, quartz, transparent ceramic (in particular Zerodur® or spinel), sapphire, polymethyl methacrylate (PMMA), polycarbonate, polyurethane. In one particular embodiment, the lower glass 3 is formed of borosilicate, a material which is particularly suited to being etched and having a refractive index of 1.47, and the upper glass 2 is formed of sapphire (refractive index: 1.76), a material which is better adapted for an external part of a watch casing as it is hard and resistant to scratches. In this case, the liquid 10 has a refractive index which is approximately 1.47. In the present invention, the liquid 10 is, for example, glycerin or a mineral oil, preferably a mineral oil.

The balls 11 are formed e.g. of gold. They are suspended in the liquid 10 when the liquid is agitated. They can settle in the pattern 8 and move depending upon the orientation of the watch under the effect of gravitational force. The balls 11 can move in particular in the channels 9 and pass from one channel 9 to the other within the lower glass 3. In one embodiment, the distance d separating the upper and lower glasses 2, 3, which corresponds to the height of the internal cavity 7, is greater than the diameter of the balls 11 such that the balls 11 can also freely circulate in the internal cavity 7 between the upper and lower glasses 2, 3. In another embodiment, the distance or height d is less than the diameter of the balls 11 such that these cannot fully enter the internal cavity 7 and thus remain in the pattern 8 and its channels 9.

Figure 2:
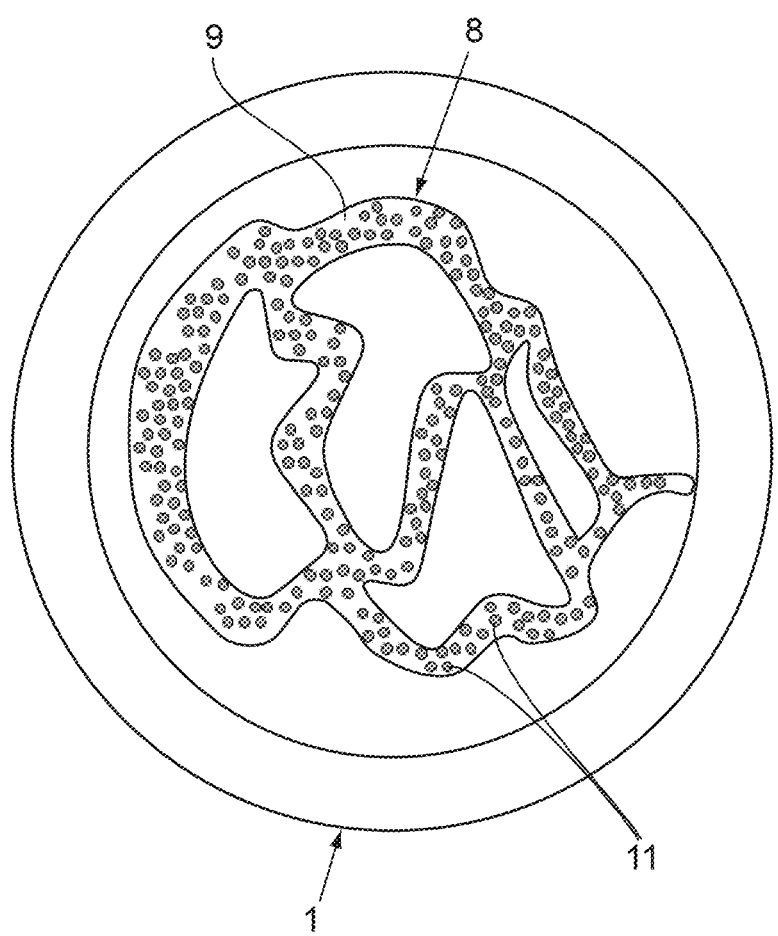
FIGS. 2 and 3 are schematic top views of the watch glass in accordance with the preferred embodiment of the invention; however, in FIG. 2 one of the components of the watch glass, namely a liquid in which mobile solid elements move, is absent.
Figure 3:
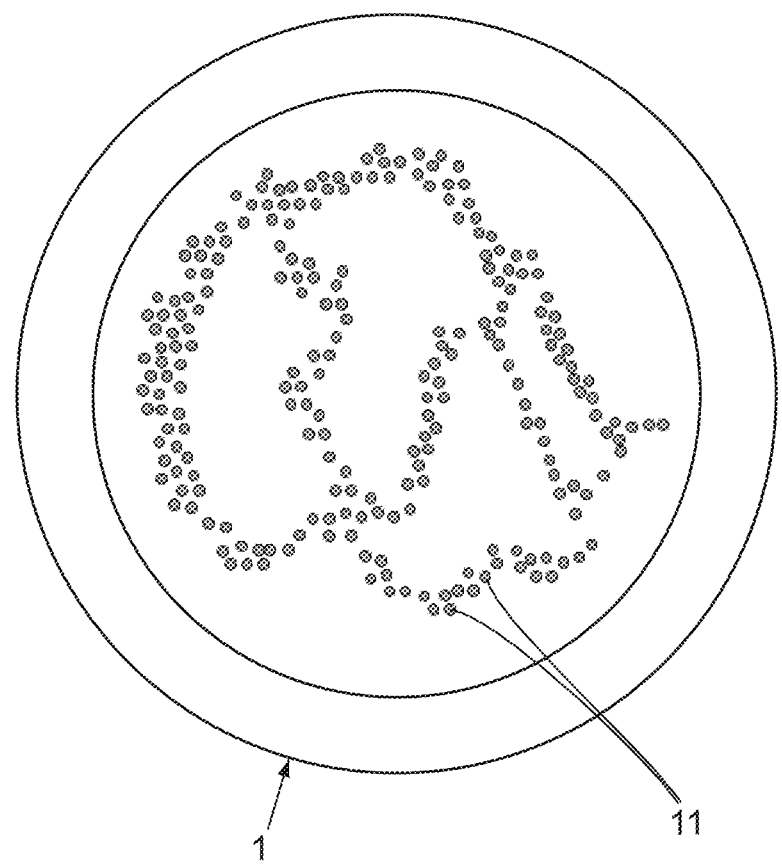

The present invention thus produces a mysterious optical effect since only the pattern as depicted by the balls 11 can be seen and the channels 9, or more generally the walls of the pattern 8, are not visible. By way of illustration, FIG. 2 shows the watch glass 1 with the balls 11 but without the liquid 10. The channels 9 of the pattern 8 can be seen therein. FIG. 3 shows the watch glass 1 with the balls 11 and the liquid 10. The channels 9 of the pattern 8 cannot be seen therein. The pattern 8 can have any desired shape.

In accordance with particular embodiments:
the balls 11 have a minimum diameter of 0.1 mm, for example about 0.5 mm; the balls 11 must not be too small so as not to slow down the movement, and also must not be too large so as not to increase the bulkiness of the watch glass 1;
in the case of a distance d between the upper and lower glasses 2, 3 sufficient to allow the balls 11 to freely circulate in the internal cavity 7, said distance d is at least 0.2 mm plus the diameter of the balls 11, i.e. for example 0.75 mm, this clearance allowing the balls 11 to circulate more easily;
in the case of a distance d between the upper and lower glasses 2, 3 insufficient to allow the balls 11 to circulate in the internal cavity 7, said distance d is at most the diameter of the balls 11 minus 0.2 mm, i.e. for example 0.3 mm; indeed, a distance d too close to the diameter of the balls 11 would increase the risk of the balls 11 becoming jammed between the glasses 2, 3;
the height of the pattern 8 and of its channels 9 is at least 0.2 mm plus the diameter of the balls 11, i.e. for example 0.75 mm;
the width of the channels 9 is at least 0.2 mm plus the diameter of the balls 11 and varies e.g. between 1.3 and 2.5 mm;
the verticality of the walls of the channels 9 is at least 60° and preferably 90°, i.e. the maximum; in the case where the balls 11 can circulate in the internal cavity 7, the verticality of the walls of the channels 9 controls the exit angle of the balls 11; however, the verticality must be sufficiently high so as to allow the balls 11 to show the desired pattern precisely; preferably, the walls have chamfers (not shown in the drawings) at the outlet of the channels 9, e.g. oriented at 45° and having a height of 0.1 to 0.2 mm.

The watch glass 1 in accordance with the preferred embodiment of the invention can be assembled in the following manner:
1) fixing the lower glass 3 in the ring 4,
2) depositing the balls 11 on the upper etched face 3a of the lower glass 3 and in particular in the pattern 8,
3) fixing the upper glass 2 in the ring 4,
4) filling the internal cavity 7 and the pattern 8 by injecting or drawing-in the liquid 10 through a radial hole (not shown) passing through the ring 4 and causing the internal cavity 7 to be in communication with the exterior,
5) closing the radial hole by a sealing screw or another type of plug,
6) cleaning the assembly with soapy water to eliminate residual traces of liquid.

If the distance d between the upper and lower glasses 2, 3 is sufficiently large, the balls 11 can be introduced into the internal cavity 7 through said radial hole with the liquid 10 instead of being disposed on the upper face 3a of the lower glass 3 as indicated in point 2).

As described above, the watch glass 1 in accordance with the invention preferably comprises the internal cavity 7 to facilitate filling of the pattern 8 and its channels 9. However, it can also be envisaged to omit this internal cavity 7, i.e. to make the distance d zero. Owing to the fact that the channels 9 communicate with each other, the pattern 8 could be filled via a filling hole causing one of the channels 9 to be in communication with the exterior. The pattern 8 can also be filled from the upper face 3a of the lower glass 3 prior to mounting the upper glass 2.

Furthermore, in variants of the invention, the upper and lower glasses 2, 3 could be connected monolithically. In other words, the watch glass in accordance with the invention could be in a single piece, the upper glass being formed by an upper part of the piece and the lower glass being formed by a lower part of the piece. In this case the watch glass could be driven into a bezel or middle-bezel of the watch casing. One technical example allowing the formation of such a monolithic watch glass consists of modifying the density of an internal zone of a transparent material using a femtosecond laser and then removing the zone in question by submerging the material into an etching solution. The laser modifies the density of the material only at the focal point of the laser beam so that it is possible to hollow out or etch an internal zone of the material in a very precise manner.

Finally, it will be clear to a person skilled in the art that the present invention could be applied to objects other than a watch case and that the object shown in the figures could form e.g. an item of jewelry or part of an item of jewelry.

The invention claimed is:

1. A decorative object (1) comprising:
   an upper glass (2),
   a lower glass (3),
   a recessed pattern (8) formed in the lower glass (3) and facing the upper glass (2),
   a liquid (10) filling the recessed pattern (8), the refractive index of the liquid (10) being equal to that of the lower glass (3) or differing from that of the lower glass (3) by at most 10%, the recessed pattern (8) comprising channels (9) which mutually communicate in the lower glass (3) so as to give a determined shape to the recessed pattern (8), and
   solid elements (11) which can move in the liquid (10),
   wherein the channels (9) include plural curved channels (9) curved differently from each other and connected to each other so as to give the determined shape to the recessed pattern (8), and
   wherein the solid elements (11) circulate in the liquid (10) and depict the determined shape of the recessed pattern (8) formed in the lower glass (3) with walls of the recessed pattern (8) in which the solid elements (11) circulate being invisible.

2. The decorative object as claimed in claim 1, wherein the refractive index of the liquid (10) is equal to that of the lower glass (3) or differs from that of the lower glass (3) by at most 5%.

3. The decorative object as claimed in claim 2, wherein the refractive index of the liquid (10) is equal to that of the lower glass (3) or differs from that of the lower glass (3) by at most 2%.

4. The decorative object as claimed in claim 3, wherein the upper glass (2) and the lower glass (3) define between them an internal cavity (7) to which the recessed pattern (8) is open.

5. The decorative object as claimed in claim 2, wherein the upper glass (2) and the lower glass (3) define between them an internal cavity (7) to which the recessed pattern (8) is open.

6. The decorative object as claimed in claim 1, wherein the upper glass (2) and the lower glass (3) define between them an internal cavity (7) to which the recessed pattern (8) is open.

7. The decorative object as claimed in claim 6, wherein the liquid (10) fills the recessed pattern (8) and the internal cavity (7) completely.

8. The decorative object as claimed in claim 7, wherein the internal cavity (7) has a height (d) sufficient for the solid elements (11) to be able to completely exit the recessed pattern (8).

9. The decorative object as claimed in claim 7, wherein the internal cavity (7) has a height (d) not sufficient to allow the solid elements (11) to completely exit the recessed pattern (8).

10. The decorative object as claimed in claim 6, wherein the internal cavity (7) has a height (d) sufficient for the solid elements (11) to be able to completely exit the recessed pattern (8).

11. The decorative object as claimed in claim 6, wherein the internal cavity (7) has a height (d) not sufficient to allow the solid elements (11) to completely exit the recessed pattern (8).

12. The decorative object as claimed in claim 1,
    wherein the plural curved channels having different widths from each other.

13. The decorative object as claimed in claim 1, wherein the solid elements (11) are balls.

14. The decorative object as claimed in claim 1, wherein the upper glass (2) is formed of a harder material than the material of the lower glass (3).

15. The decorative object as claimed in claim 1, wherein the upper glass (2) is formed of sapphire and the lower glass (3) is formed of borosilicate.

16. The decorative object as claimed in claim 1, wherein the lower glass (3) is formed of one of the following materials: borosilicate, crystalline glass, fused silica, crown glass, flint glass, quartz, transparent ceramic, sapphire, polymethyl methacrylate, polycarbonate, polyurethane.

17. The decorative object as claimed in claim 1, wherein the upper glass (2) is formed of one of the following materials: borosilicate, crystalline glass, fused silica, crown glass, flint glass, quartz, transparent ceramic, sapphire, polymethyl methacrylate, polycarbonate, polyurethane.

18. The decorative object as claimed in claim 1, consisting of a watch glass.

19. The decorative object as claimed in claim 1, wherein the solid elements (11) circulate in the liquid (10) and depict the recessed pattern (8) formed in the lower glass (3) with walls of the recessed pattern (8) in which the solid elements (11) circulate being invisible.

20. The decorative object as claimed in claim 1, wherein,
    the upper glass (2) and the lower glass (3) define between them an internal cavity (7) to which the recessed pattern (8) is open,
    the liquid (10) fills the recessed pattern (8) and the internal cavity (7) completely, and
    the solid elements (11) circulate in the liquid (10) and depict the recessed pattern (8) formed in the lower glass (3) with the walls of the recessed pattern in which the solid elements (11) circulate being invisible.

* * * * *